(12) United States Patent
Semke

(10) Patent No.: US 6,202,812 B1
(45) Date of Patent: Mar. 20, 2001

(54) SIMPLIFIED TRANSFER CASE SHIFT ACTUATOR

(75) Inventor: Michael G. Semke, Novi, MI (US)

(73) Assignee: Meritor Heavy Vehicle (*) Notice: Subject to any disclaimer, the term of this patent is extended or adjusted under 35 U.S.C. 154(b) by 0 days.

(21) Appl. No.: 09/427,796

(22) Filed: Oct. 27, 1999

(51) Int. Cl.[7] .......................... B60K 17/344; F16D 25/10
(52) U.S. Cl. ..................... 192/48.91; 192/87.14; 74/335; 74/473.11
(58) Field of Search ..................... 192/48.91, 87.14, 192/87.19, 86, 69.9; 74/473.11, 335; 180/247

(56) References Cited

U.S. PATENT DOCUMENTS

| | | | |
|---|---|---|---|
| 2,092,580 | * | 9/1937 | Kelley ............................ 192/87.14 |
| 2,802,554 | * | 8/1957 | Pringle ......................... 192/48.91 X |
| 4,261,216 | * | 4/1981 | Braun ............................... 74/335 X |
| 4,702,127 | * | 10/1987 | Cote ................................. 74/335 X |
| 5,020,419 | * | 6/1991 | Amedei et al. ................... 192/86 X |
| 5,669,265 | * | 9/1997 | Adler ................................... 74/335 |
| 6,076,420 | * | 6/2000 | Ito et al. ........................ 74/473.11 |

* cited by examiner

Primary Examiner—Richard M. Lorence
(74) Attorney, Agent, or Firm—Carlson, Gaskey & Olds

(57) ABSTRACT

A simplified shift actuator utilizes standard hydraulic components to achieve high neutral and low positions. A floating piston is movable within a cylinder, and abuts a spacer after a predetermined amount of movement. Once the floating piston abuts the spacer, further movement of the rod is prevented. This defines the neutral position. The use of the spacer and the floating piston provides a simplified arrangement for achieving the neutral position when compared to the prior art.

4 Claims, 3 Drawing Sheets

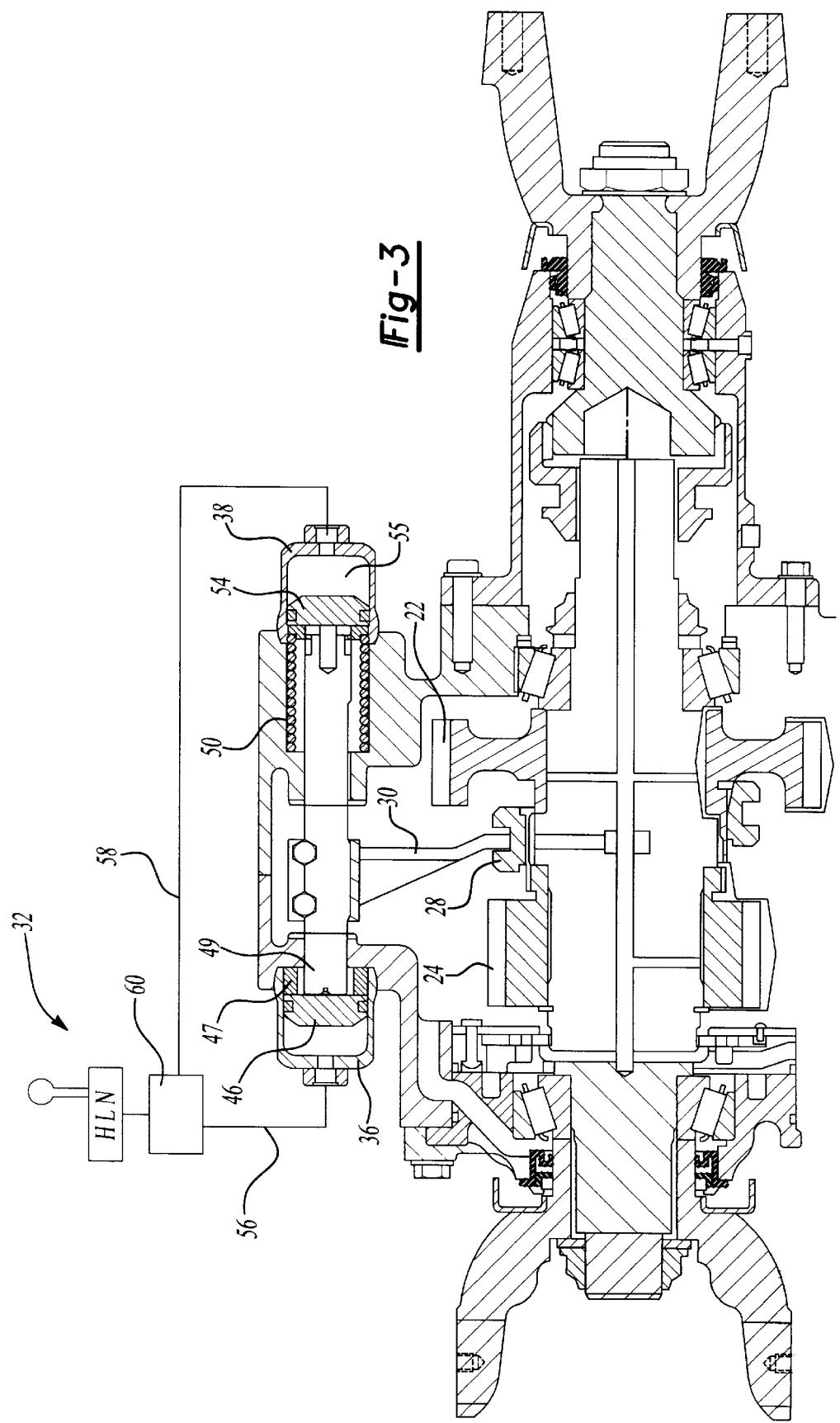

SIMPLIFIED TRANSFER CASE SHIFT ACTUATOR

BACKGROUND OF THE INVENTION

This invention relates to a shift actuator for moving a transfer case between high, low and neutral positions which is simplified when compared to the prior art.

Transfer cases are utilized in many medium to heavy vehicles to allow shifting between high and low ranges, and also movement into a neutral range. The transfer case typically allows rotational drive from a vehicle engine to be distributed between front and rear axles. The shift actuator allows changing the rotational drive between high and low ranges. The provision of the neutral position allows the operator to place the vehicle into neutral while still driving a power take-off. The power take-off on medium to heavy vehicles is often used to power auxiliary functions. Examples of such auxiliary functions are driving a winch, a boom for utility trucks, etc.

One challenge in providing three distinct positions is to have the shift actuator movable, and securely held at each of the three positions. Typically, cylinders are utilized to drive a shift fork between the particular positions. In one known arrangement, a valve rod moves with the shift actuator. The valve rod has two pneumatic pistons which selectively drive the rod between two positions. One piston is selectively engaged with a surface on the rod to contact and drive the rod to the third position. Typically, the known devices have required part of unique and complex configurations.

It would be desirable to provide a simplified shift actuator for vehicle transfer cases.

SUMMARY OF THE INVENTION

In a disclosed embodiment of this invention, a shift rod for moving a shift fork extends between two ends. Pneumatic cylinders are disposed adjacent each end for selectively driving the rod between the three positions. A spring drives the rod to a first position. If the two cylinders are vented to atmosphere, the spring is the sole driving force on the rod, and maintains the rod in a first position. A second position is achieved by applying pneumatic pressure through a first pneumatic cylinder in opposition to the spring. This holds the shift rod at the second position. The first and second positions are preferably the high and low positions, respectively. The shift rod has an end which moves through a spacer toward a second pneumatic cylinder. The second cylinder includes a separate piston. The separate piston is operable to move upon pneumatic pressure being delivered into the second hydraulic cylinder. The piston contacts an end of the rod, driving the rod in opposition to pressure in the first cylinder. Since the pressure in the second cylinder is assisted by the spring force, the rod moves in the direction of the pressure of the second cylinder, and the spring force against the first cylinder pressure. This causes the rod to move back away from the second position. The second cylinder is preferably provided with a spacer or stop which stops movement of the second piston after a predetermined amount of movement. At that location, the second piston is maintained against the stop, and abutting an end of the rod. The rod is thus held at an intermediate position, which is preferably neutral in the transfer case. The present invention thus utilizes only simple pneumatic structure, and reduces the complexity of providing a reliable shift actuator for vehicle transfer cases.

These and other features of the present invention can be best understood from the following specification and drawing, the following of which is a brief description.

BRIEF DESCRIPTION OF THE DRAWINGS

FIG. 3 shows a shift actuator in a third position.

DETAILED DESCRIPTION OF A PREFERRED EMBODIMENT

Figure 1:
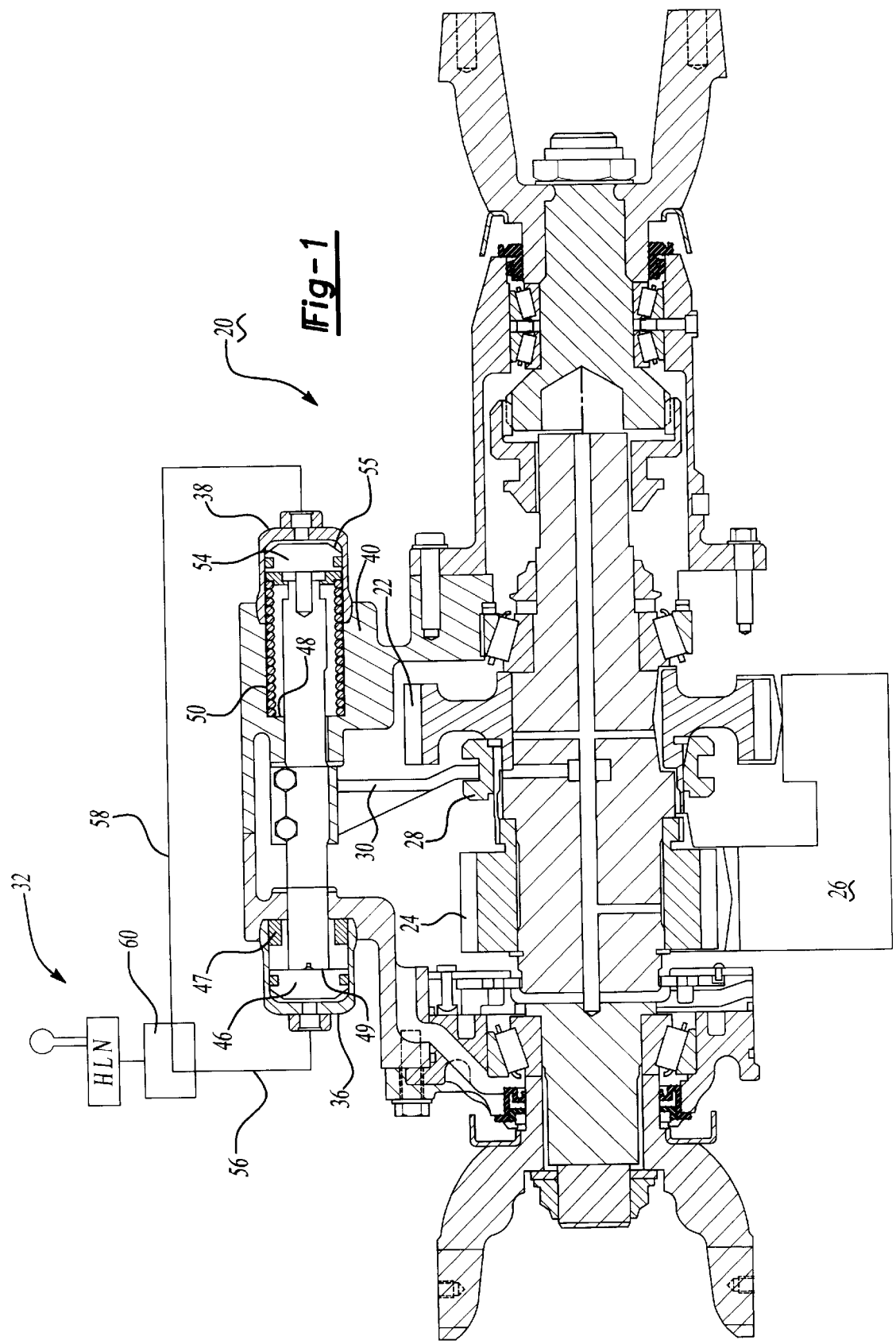
FIG. 1 shows a unique vehicle transfer case shift actuator in a first position.

FIG. 1 shows a transfer case 20 incorporating a high ratio input gear 22 and a low ratio input gear 24. The gears both connect to further gearing structure 26 shown schematically, which delivers rotational drive to the front and rear axles of the vehicle. The basic structure of the transfer case is as known, and thus is shown somewhat schematically. A shift collar 28 is driven by a shift fork between the gears 22 and 24 to achieve high and low range. An operator lever or switch 32 may be utilized to select high, low or neutral positions. Alternatively, the high and low position may be achieved by some automatic control. However, the operator should have the ability to select neutral for driving accessories, as described above.

A shift actuator 34 incorporates a first pneumatic cylinder 36 at one end and a second pneumatic cylinder 38 at an opposed end. A housing 40 surrounds the shift actuator 34. A rod 42 moves within the housing 40 under the influence of pneumatic pressure from the cylinders 36 and 38. A space or chamber 44 is defined forwardly of a floating piston 46 in the cylinder 36. A spacer 47 is fixed within chamber 44, and an end 49 of the rod 42 is positioned just outwardly of the chamber 44 in the FIG. 1 position. In the FIG. 1 position, both cylinders 36 and 38 are vented to atmosphere, and no pneumatic pressure is provided onto the rod 42. Instead, spring 50, which abuts off an end shoulder 48 in the housing 40, biases a piston 52 outwardly against a piston 54. Thus, the rod 42 is driven to the right as shown in FIG. 1, and the shift collar 28 is maintained in engagement with the gear 22. This provides high range.

A control 60 electively controls the application of air to the two lines 56 and 58 communicating with the cylinders 36 and 38. As mentioned in the high position, both lines 56 and 58 are vented to atmosphere.

Figure 2:
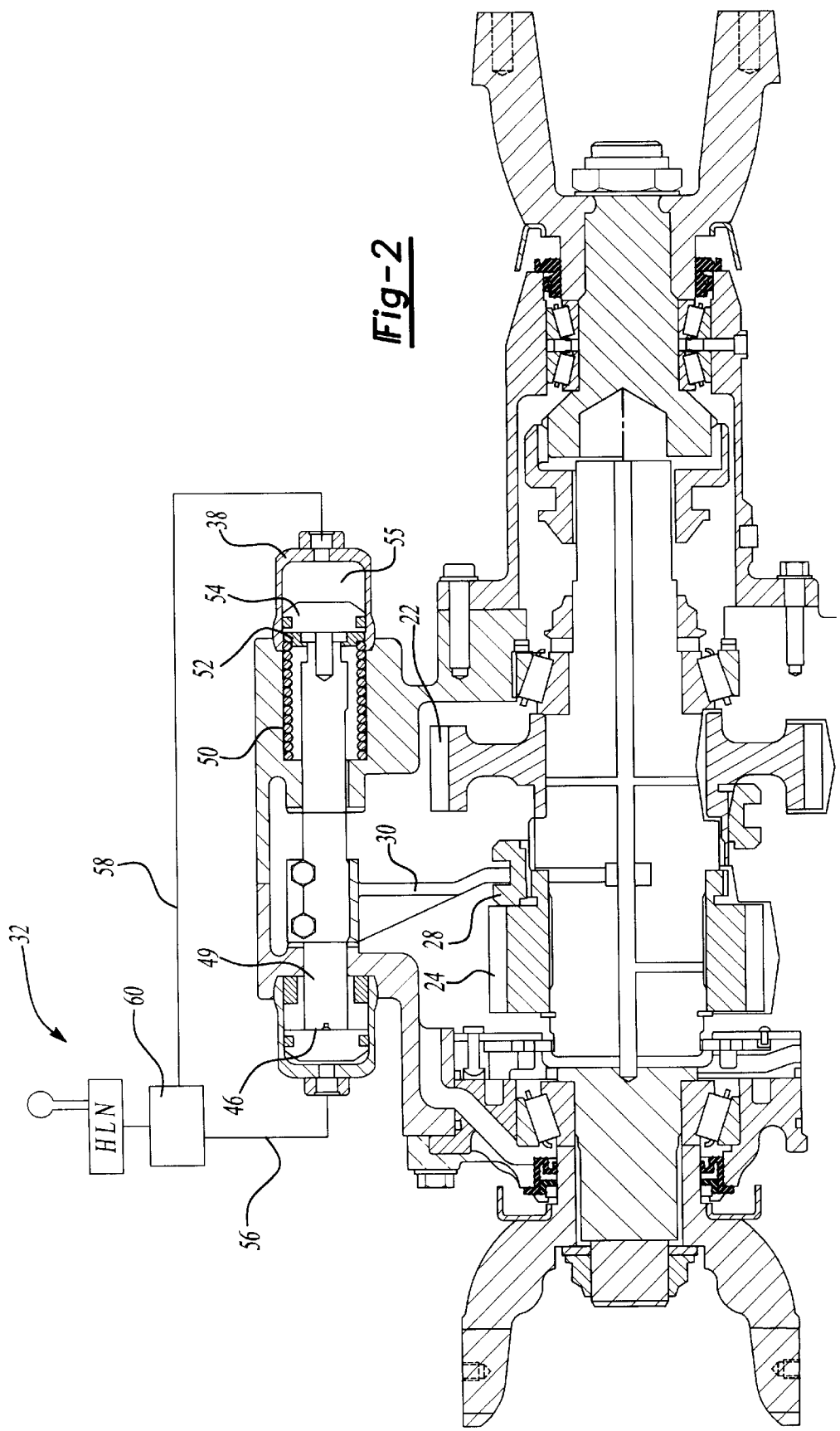
FIG. 2 shows the shift actuator having been moved to a second position.

As shown in FIG. 2, pressurized air has now been applied to the line 58. This air moves into the cylinder 55 and drives the piston 54 to the left as shown in FIG. 2 against the force of the spring 50. Since the line 56 is still vented to atmosphere, the rod 49 also moves to the left and abuts the floating piston 46. The shift collar 28 has now been driven to the left by the shift fork 30 and engages the low range gear 24.

When a neutral position is desired, air is supplied to both lines 56 and 58. The air in the line 56 is in addition to the force of the spring 50. Thus, the combined air and spring 50 will overcome the force of the air in chamber 55 and the rod moves to the right. However, after a short period of movement, the floating piston 46 abuts the spacer 47. At that position, while there is continued force from the line 56 holding the piston 46 tightly against the spacer 47, the piston 46 can no longer force the end 49 of the rod 42 further to the right. Shift collar 28 is left in intermediate position between the gears 22 and 24. In this position, the system is in neutral, and no gear is engaged.

Fork 30 is connected to move with rod 42 in a known fashion.

The present invention is able to achieve these three positions with very simple pneumatic structure. Other type cylinders, such as hydraulic cylinders may be used. No complex machining or design of parts is necessary.

A preferred embodiment of this invention has been disclosed; however, a worker of ordinary skill in this art would recognize that certain modifications would come within the scope of this invention. For that reason, the following claims should be studied to determine the true scope and content of this invention.

What is claimed is:

1. A transfer case and shift actuator comprising:

a first gear associated with a high range and a second gear associated with a low range, a shift collar and a shift fork for moving said shift collar;

a shift rod for moving said shift fork between a first position at which said shift collar engages said first gear, a second position at which said shift collar engages said second gear, and a third position at which said shift collar engages neither gear, said rod being driven for movement between said three positions by a pair of cylinders, with one cylinder being mounted adjacent each end of said shift rod, and a spring biasing said rod towards one of said cylinders; and a floating piston separate from said rod and mounted within one of said cylinders, said floating piston being movable under the influence of pressurized fluid in said one of said cylinders to drive said rod in a first direction, said floating piston abutting a stop fixed within a cylinder housing to limit movement of said floating piston, and hence said rod to a predetermined amount, and the provision of pressurized fluid into said one of said cylinders and driving said floating piston against said spacer providing said third position, the venting of both cylinders to atmosphere allowing the spring to drive said rod to said first position, and the provision of air into a second of said cylinders driving said rod against the force of said spring to said second position.

2. A transfer case as recited in claim 1, wherein said first position is a high range and said second position is a low range.

3. A transfer case as recited in claim 1, wherein said rod has a first end which is an abutment surface for said spring, said spring forcing said rod first end toward said second cylinder, and said rod second end being movable within said spacer, and beyond said spacer such that said rod second end moves outwardly of said spacer at said second position.

4. A vehicle transfer case shift actuator comprising:

a shift rod movable with a shift fork, said shift rod having first and second ends, and being movable within a housing;

a spring abutting a first end of said rod, and abutting a shoulder in said housing for driving said rod in a first direction;

a floating piston movable within a first cylinder and adjacent said second end of said rod, and a spacer mounted within said first cylinder for limiting movement of said floating piston in said first direction, a second cylinder for driving said first end of said rod in a direction opposed to said first direction; and;

three positions of said shift actuator being achieved by venting both of said cylinders to atmosphere, such that said spring can drive said rod to a predetermined first position, applying pressurized fluid to said second cylinder to force said rod against said spring force to a second position, and applying pressurized fluid to both of said cylinders such that said floating piston acts in combination with said spring to drive said rod in said first direction, but said floating piston being stopped after a predetermined amount of movement by abutting said spacer such that said rod is held at an intermediate position between said first and second positions.

\* \* \* \* \*